(12) United States Patent
Kongkanand

(10) Patent No.: US 11,121,379 B2
(45) Date of Patent: Sep. 14, 2021

(54) CAGED NANOPARTICLE ELECTROCATALYST WITH HIGH STABILITY AND GAS TRANSPORT PROPERTY

(71) Applicant: GM GLOBAL TECHNOLOGY OPERATIONS LLC, Detroit, MI (US)

(72) Inventor: Anusorn Kongkanand, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 14/991,167

(22) Filed: Jan. 8, 2016

(65) Prior Publication Data

US 2016/0211530 A1    Jul. 21, 2016

Related U.S. Application Data

(60) Provisional application No. 62/103,832, filed on Jan. 15, 2015.

(51) Int. Cl.
*H01M 4/90* (2006.01)
*H01M 4/92* (2006.01)

(52) U.S. Cl.
CPC ........ *H01M 4/9016* (2013.01); *H01M 4/9058* (2013.01); *H01M 4/921* (2013.01); *H01M 2250/20* (2013.01); *Y02T 90/40* (2013.01)

(58) Field of Classification Search
CPC .... H01M 4/9016; H01M 4/90; H01M 4/9058; H01M 4/921; H01M 4/92; H01M 2250/20; Y02T 90/32; Y02T 90/40
See application file for complete search history.

(56) References Cited

U.S. PATENT DOCUMENTS

| 7,659,224 B2 | 2/2010 | Shimazaki et al. |
| 2004/0161641 A1* | 8/2004 | Lee ........................ H01M 4/921 429/492 |

(Continued)

FOREIGN PATENT DOCUMENTS

| CN | 102239003 A | 11/2011 |
| CN | 103785380 A | 5/2014 |

(Continued)

OTHER PUBLICATIONS

JP 2000-256007 Englilsh Machine translation with JPO Abstract Sep. 19, 2000.*

(Continued)

*Primary Examiner* — Cynthia H Kelly
*Assistant Examiner* — Aaron J Greso
(74) *Attorney, Agent, or Firm* — Harness, Dickey & Pierce, P.L.C.

(57) ABSTRACT

A method for forming a caged electrocatalyst particles for fuel cell applications include a step of forming modified particles having a porous $SiO_2$ shell on a surface of platinum-containing particles. The modified particles are subjected to acid treatment or electrochemical oxidation to remove a portion of the platinum-containing particle thereby creating caged electrocatalyst particles having a gap between the platinum-containing particles and their $SiO_2$ shell.

17 Claims, 4 Drawing Sheets

(56) References Cited

U.S. PATENT DOCUMENTS

| | | | |
|---|---|---|---|
| 2005/0014060 A1* | 1/2005 | Suzuki | H01M 4/8605 429/482 |
| 2006/0057355 A1 | 3/2006 | Suzuki et al. | |
| 2007/0026294 A1* | 2/2007 | Shimazaki | B01J 23/42 502/180 |
| 2007/0213494 A1* | 9/2007 | Mal | C08G 77/28 528/30 |
| 2009/0202869 A1 | 8/2009 | Sawaki et al. | |
| 2009/0291352 A1* | 11/2009 | Oshihara | H01M 4/8807 429/518 |
| 2009/0311568 A1 | 12/2009 | Yamada | |
| 2011/0003071 A1* | 1/2011 | Uensal | B01J 31/0284 427/58 |
| 2011/0223096 A1 | 9/2011 | Wolf et al. | |
| 2012/0035388 A1* | 2/2012 | Li | B01J 21/185 560/60 |
| 2014/0106260 A1 | 4/2014 | Carginello et al. | |
| 2015/0340703 A1 | 11/2015 | Fujii et al. | |

FOREIGN PATENT DOCUMENTS

| | | | | |
|---|---|---|---|---|
| CN | 105810961 A | | 7/2016 | |
| DE | 102016100400 A1 | | 7/2016 | |
| JP | 2000-256007 | * | 9/2000 | C01B 33/12 |
| JP | 2007175558 A | | 7/2007 | |
| JP | 2007229594 A | | 9/2007 | |
| JP | 2007335171 A | | 12/2007 | |
| JP | 2008004541 A | | 1/2008 | |
| JP | 2009193956 A | | 8/2009 | |
| JP | 2010027607 A | | 2/2010 | |
| JP | 2011181359 A | | 9/2011 | |
| JP | 2012049070 A | | 3/2012 | |
| JP | 2014096299 A | | 5/2014 | |
| JP | 2016154135 A | | 8/2016 | |
| WO | 2004110930 A1 | | 12/2004 | |
| WO | 2005093881 A1 | | 10/2005 | |
| WO | WO 2012/095862 | * | 7/2012 | H01M 4/86 |

OTHER PUBLICATIONS

Nan, Y., "Preparation and Application of Cage-like Oxide Nano Particles," a dissertation for doctor's degree, pp. 12-18 and 75-93, 2014, 24 pgs. (English Abstract included).
English language machine translation provided by Espacenet for First Office Action for corresponding Chinese Patent Application No. 201610185986.2 dated Nov. 9, 2017 citing "A" category references CN 102239003 A and CN 103785380 A.
Englih language machine translation provided by Espacenet for First Office Action for corresponding Japanese Patent Application No. 2016-154135 dated Dec. 16, 2016 citing "X" category reference WO 2004/110930 A1, "Y" references JP 2007335171 A and JP 2011181359 A, and "A" category references WO 2005/093881 A1. JP 2008004541 A, JP 2010027607 A, JP 2012049070 A, JP 2014096299 A and US 2014/0106260 A1.
English language machine translation provided by Espacenet for Second Office Action for Japanese Patent Application No. 2016-154135 dated May 23, 2017 citing JP 2007229594 A.
English language machine translation provided by Espacenet for CN 102239003 A. Further, U.S. Publication No. 2011/0223096 A1 is believed to be an English language equivalent of CN 102239003 A.
English language machine translation provided by Espacenet for CN 103785380 A.
English language machine translation provided by Espacenet for CN 105810961 A. As noted below, this is a publication of counterpart Chinese Patent Application No. 201610185956.2 to the present application.
English language machine translation provided by Espacenet for DE 102016100400 A1. As noted below, this is a publication of counterpart German Patent Application No. 102016100400.6 to the present application.
English language machine translation provided by Espacenet for JP 2007175558 A.
English language machine translation provided by Espacenet for JP 2007229594 A.
English language machine translation provided by Espacenet for JP 2007335171 A. Further, U.S. Publication No. 2009/0202869 is believed to be an English language equivalent of JP 2007335171 A.
English language machine translation provided by Espacenet for JP 2008004541 A. Further, U.S. Publication No. 2009/0291352 is believed to be an English language equivalent of JP 2008004541 A.
English language machine translation provided by Espacenet for JP 2009193956 A.
English language machine translation provided by Espacenet for JP 2010027607 A. Further, U.S. Publication No. 2009/0311568 is believed to be an English language equivalent of JP 2010027607 A.
English language machine translation provided by Espacenet for JP 2011181359 A.
English language machine translation provided by Espacenet for JP 2012049070 A.
English language machine translation provided by Espacenet for JP 2014096299 A. Further, U.S. Pub. No. 2015/0340703 is believed to be an English language equivalent of JP 2014096299 A.
English language machine translation provided by Espacenet for JP 2016154135 A. As noted below, this is a publication of counterpart Japanese Patent Application No. 2016-154135 to the present application.
English language machine translation provided by Espacenet for WO 2004/110930 A1. Further, U.S. Publication No. 2006/0057355 is believed to be an English language equivalent of WO 2004/110930 A1.
English language machine translation provided by Espacenet for WO 2005/093881 A1. Further, U.S. Pat. No. 7,659,224 is believed to be an English language equivalent of WO 2005/093881 A1.
CN 105810961 A is a publication of counterpart Chinese Patent Application No. 201610185956.2 to the present application.
DE 102016100400 A1 is a publication of counterpart German Patent Application No. 102016100400.6 to the present application.
JP 2016154135 A is a publication of counterpart Japanese Patent Application No. 2016-154135 to the present application.
U.S. Pub. No. 2009/0291352, which is believed to be an English language equivalent of JP 2008004541 A cited in First Office Action for corresponding Japanese Patent Application No. 2016-154135, was previously cited and considered by Examiner dated Sep. 27, 2018.
First Office Action for Chinese Patent Application No. 201610185956.2 dated Nov. 9, 2017 with English language machine translation, 13 pages.
First Office Action for Japanese Patent Application No. 2016-154135 dated Dec. 16, 2016 with English language machine translation, 24 pages.
Second Office Action for Japanese Patent Application No. 2016-154135 dated May 23, 2017 with English language machine translation, 4 pages.
Takenaka, Sakae et al., "Improvement in Catalytic Performance of Carbon Nanotube-supported Metal Nanoparticles by Coverage sith Silica Layers," Journal of the Japan Petoleum Institute, 54 (2), pp. 80-89 (2011); DOI: 10.1627/pi.54.80.
Snyder, J. et al., "Oxygen reduction in nanoporous metal-ionic liquid composite electrocatalysts," Nature Materials, 9, pp. 904-907 (Oct. 17, 2010); DOI: 10.1038/nmat2878.

* cited by examiner

CAGED NANOPARTICLE ELECTROCATALYST WITH HIGH STABILITY AND GAS TRANSPORT PROPERTY

CROSS-REFERENCE TO RELATED APPLICATIONS

This application claims the benefit of U.S. provisional application Ser. No. 62/103,832 filed Jan. 15, 2015, the disclosure of which is hereby incorporated in its entirety by reference herein.

TECHNICAL FIELD

In at least one embodiment, the present invention relates to fuel cell catalyst layers.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM"), to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates referred to as flow field plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

Conventional fuel cell electrocatalysts involve Pt, Pt alloy, or Pt core-shell nanoparticles dispersed on high-surface-area support such as carbon black. The highly dispersed metal nanoparticles are susceptible to dissolution. In addition the weak bonding between the metal nanoparticles to the carbon support leads to particle coalescence. These provide non-optimum stability. On the other hand, it is suggested that direct contact of ionomer to Pt surface can cause increase in oxygen transport resistance which leads to voltage loss at high power.

Accordingly, there is a need for improved catalyst design for making highly active and stable fuel cell catalysts.

SUMMARY

The present invention solves one or more problems of the prior art by providing in at least one embodiment, caged electrocatalyst particles suitable for incorporation into a fuel cell catalyst layers. Each electrocatalyst particle includes a metal oxide shell defining a central cavity with a platinum group metal-containing particle disposed within the cavity. Characteristically, the metal oxide shell has an average diameter less than 100 nm.

In another embodiment, a method for forming the caged electrocatalyst particles set forth above is provided. The method comprises:

a) reacting a platinum group metal-containing with an absorption solution, the absorption solution including a compound having formula 1 and a compound having formula 2:

$$X_1-R_2-M-(OR_1)_n \qquad 1$$

$$X_2-R_3-Y \qquad 2$$

wherein:
$X_1$ and $X_2$ are each independently SH or $NH_2$;
$R_1$ are each independently $C_{1-6}$ alkyl;
M is a metal that forms a metal oxide such as Si, Al, Ti, W and the like;
Y is a moiety that does not react with the compound having formula 1 such as $CO_2H$, $CH_3$, $NH_2$, halo, and the like;
n is an integer represent the number of $OR_1$ groups attached to M; and
$R_2$, $R_3$ are each independently is a $C_{1-6}$ alkylenyl;

b) allowing the metal M in the compound having formula 1 to hydrolyze to form modified particles having a porous metal oxide shell on a surface of the platinum group metal-containing particle; and c) subjecting the modified particles to acid treatment or electrochemical oxidation to remove a portion of the platinum group metal-containing particles thereby creating caged electrocatalyst particles having a gap between the platinum group metal-containing particle and the metal oxide shell.

As set forth above, the caged electrocatalyst particles are suitable for fuel cell applications. In addition, these particles can also be incorporated into any device that uses precious metal catalysts. An example of such a device is an automotive catalytic converter. The high operating temperature of the catalytic converter accelerates particle growth of the catalyst particle and performance degradation. The caged nanoparticle can mitigate such degradation.

DETAILED DESCRIPTION

Figure 1:
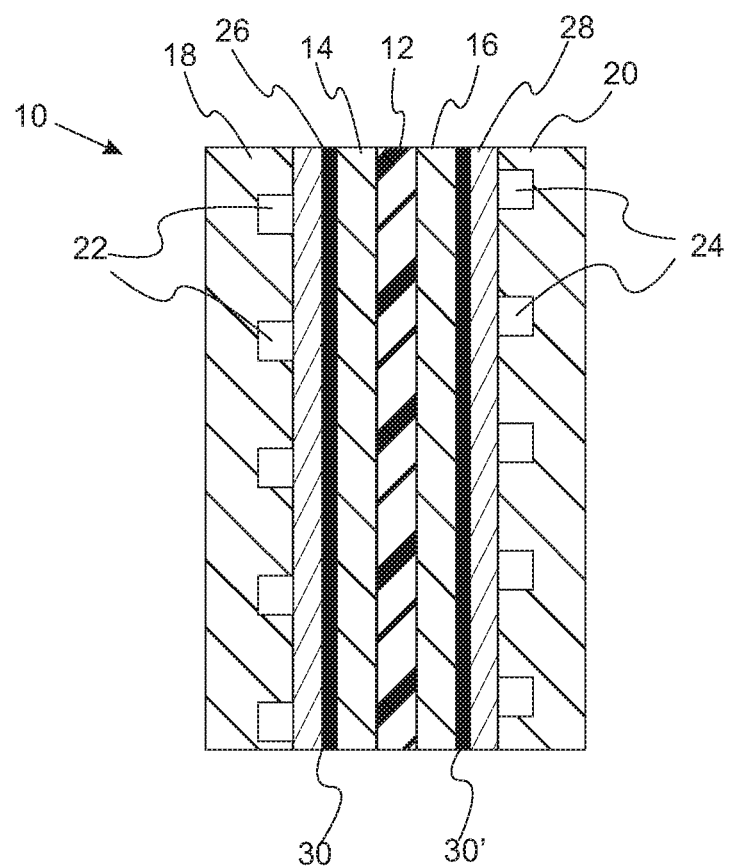
FIG. 1 provides a schematic of a fuel cell system including an embodiment of a carbon coated bipolar plate.

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The term "alkylenyl" means bridging divalent alkyl radicals such as methylenyl and ethylenyl. In one refinement, alkylenyl is —($CH_2$)— where n is 1 to 10 or 1 to 4.

The term "nanoparticle" means a particle having at least one dimension less than 100 nanometers.

The term "platinum group metal" means ruthenium, rhodium, palladium, osmium, iridium, or platinum.

The term "non-noble metal" means a metal that is not a platinum group metal.

With reference to FIG. 1, a schematic cross section of a fuel cell that incorporates an embodiment of a grafted porous membrane is provided. Proton exchange membrane fuel cell 10 includes polymeric ion conducting membrane 12 disposed between cathode catalyst layer 14 and anode catalyst layer 16. Advantageously, one or both of cathode catalyst layer 14 and anode catalyst layer 16 include the caged electrocatalyst particles set forth below. Collectively, the combination of the ion conducting membrane 12, cathode catalyst layer 14 and anode catalyst layer 16 are a metal electrode assembly. Fuel cell 10 also includes flow field plates 18, 20, gas channels 22 and 24, and gas diffusion layers 26 and 28. Typically, gas diffusion layers 26 and 28 respectively include microporous layers 30, 30' disposed over a face of diffusion material in the gas diffusion layers. The microporous layers 30, 30' respectively contact cathode catalyst layer 14 and anode catalyst layer 16. In a refinement, flow field plates 18, 20 are bipolar plates. Typically, flow field plates are electrically conductive and are therefore formed from a metal such as stainless steel. In other refinements, the flow field plates formed from an electrically conductive polymer. Hydrogen ions are generated by anode catalyst layer 16 migrate through polymeric ion conducting membrane 12 were they react at cathode catalyst layer 14 to form water. This electrochemical process generates an electric current through a load connected to flow field plates 18 and 20.

Figure 2:
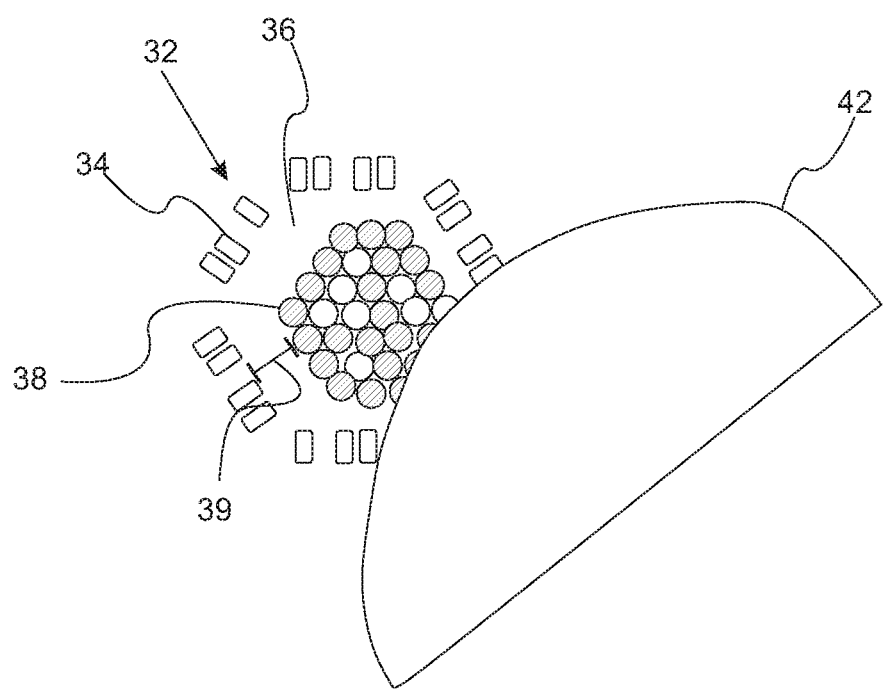
FIG. 2 is a schematic cross-section of a caged electrocatalyst particle that can be incorporated into a fuel cell catalyst layer.

With reference to FIG. 2, a schematic cross section of a cage catalyst particle formed by the methods set forth below is provided. Caged electrocatalyst particles 32 include metal oxide shell 34 which defines a central cavity 36. Platinum group metal-containing particles 38 are disposed with central cavity 36. Metal oxide shell 34 defines a gap 39 between the metal oxide shell and the platinum group metal-containing particle. In a refinement, the metal oxide shell 34 is formed from silicon oxide (e.g., $SiO_2$), aluminum oxide or combinations thereof. Typically, metal oxide shell 34 has an average spatial diameter (or largest average dimension) less than 100 nm. In a refinement, metal oxide shell 34 has an average spatial diameter (or largest average dimension) from about 1 to 15 nm. In another refinement, metal oxide shell 34 has an average spatial diameter (or largest average dimension) from about 5 to 10 nm.

Since the metal oxide shell typically has an average spatial diameter less than 100 nm, the caged electrocatalyst particles 32 are also usually nanoparticles having an average diameter (or largest average dimension) less than 100 nm. In a refinement, caged electrocatalyst particles 32 are nanoparticles having an average diameter (or largest average dimension) from about 1 to 15 nm. In still another refinement, platinum group metal-containing particles 38 are nanoparticles having an average spatial diameter (or largest average dimension) from about 2 to 8 nm. In a further refinement, gap 39 has an average distance between shell 34 and electrocatalyst particles 38 from about 0.1 to 4 nm. In other refinement, gap 39 has an average distance between shell 34 and platinum group metal-containing particles 38 from about 0.5 to 2 nm. These electrocatalyst particles can then be incorporating into fuel cell catalyst layers set forth above by methods known to those skilled in the art of fuel cell technology. In many applications such as in fuel cells, caged electrocatalyst particles 32 are supported on substrates 42 such as carbon particles (e.g. carbon black).

In one variation, platinum group metal-containing particles 38 are platinum alloys particles. In a refinement, such platinum alloys include a non-noble metal such as Fe, Ni, Co, Cu, and the like. In a refinement, the platinum-containing particles have formula $P^OM^O_y$, where $P^O$ is a platinum-group metal (e.g., ruthenium (Ru), rhodium (Rh), palladium (Pd), osmium (Os), iridium (Ir), and platinum (Pt)), $M^O$ is a non-noble metal, and y is the atomic ratio between the $P^O$ is and the $M^O$. In a refinement, y ranges from 1 to 18. In a further refinement, $P^O$ is Ru, Rh, Pd, Ir, or Pt. In a refinement, $M^O$ is Fe, Ni, Co, Cu, and the like. An example of a particularly useful platinum alloy is platinum-nickel alloy such as $PtNi_3$ particles. Other examples of platinum group metal particles are PtCo particles, $PtCo_3$ particles, $PtCu_3$ particles, $PtZn_3$ particles, $PtFe_3$ particles, $PdNi_3$ particles, $PdFe_3$ particles, $PdRhFe_3$ particles, $PtPdRhNi_2$ and the like.

Figure 3A:
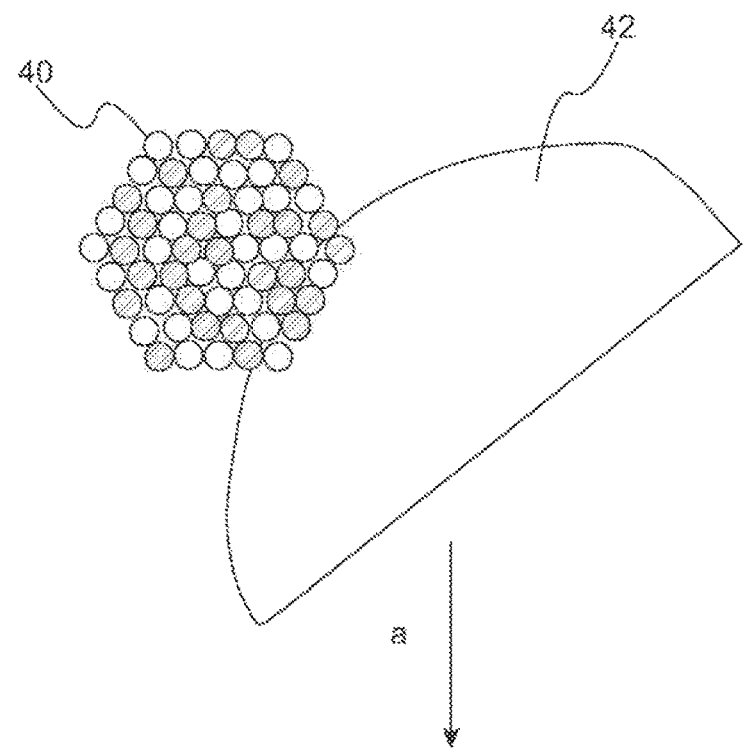
FIG. 3A provides a schematic flowchart showing the formation of caged electrocatalyst particles with high stability.
Figure 3A:
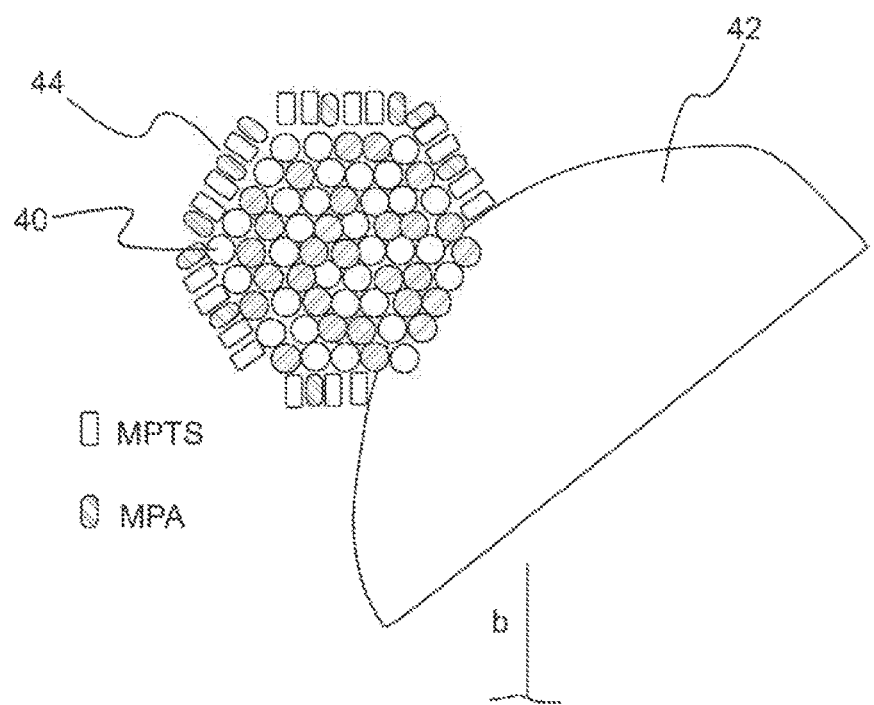
Figure 3B:
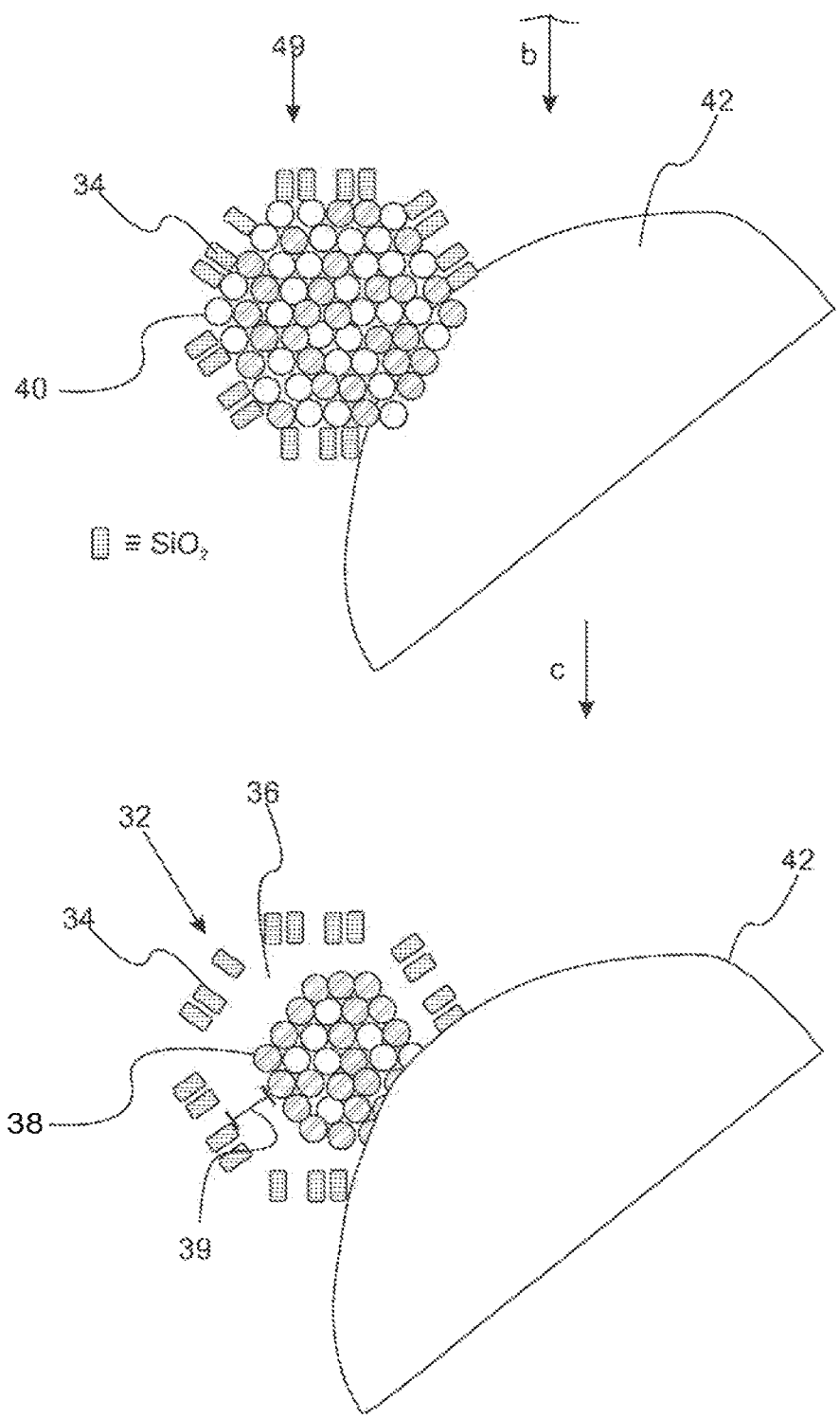
FIG. 3B is a continuation of FIG. 3.

With reference to FIGS. 3A and 3B, a method for making caged electrocatalyst particles is schematically illustrated. In step a), platinum group metal-containing particles 40 are reacted with absorption solution. In a refinement, platinum group metal-containing particles 40 are nanoparticles. In a further refinement, platinum group metal-containing particles 40 are nanoparticles having an average diameter (or largest average dimension) less than or equal to 100 nm. In still another refinement, platinum group metal-containing particles 40 are nanoparticles having an average diameter (or largest average dimension) from about 1 to 15 nm. In still another refinement, platinum group metal-containing particles 40 are nanoparticles having an average diameter (or largest average dimension) from about 2 to 10 nm. Examples of solvents include, but are not limited to, alcohols, toluene, tetrahydrofuran, and combinations thereof. In a refinement, the absorption solution includes a compound having formula 1 and a compound having formula 2:

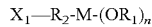
$$X_1—R_2-M-(OR_1)_n \qquad 1$$

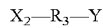
$$X_2—R_3—Y \qquad 2$$

wherein:
 $X_1$ and $X_2$ are each independently SH or $NH_2$;
 $R_1$ are each independently $C_{1-6}$ alkyl;
 M is a metal that forms a metal oxide such as Si, Al, Ti, W and the like;
 Y is a moiety that does not react with the compound having formula 1 such as $CO_2H$, $CH_3$, $NH_2$, halo, and the like;
 n is an integer represent the number of $OR_1$ groups attached to M. In a refinement, n is 1, 2, 3, 4, 5, or 6. In an example, when M is Si or Ti, n is 3 and when M is Al, n is 2; and
 $R_2$, $R_3$ are each independently is a $C_{1-6}$ alkylenyl. In a particularly useful refinement, $X_1$ and/or $X_2$ is SH. In another refinement, M is not a platinum group metal.

In a refinement, platinum group metal-containing particles 40 are supported on substrates 42 such as carbon particles (e.g. carbon black). In still another refinement, platinum group metal-containing particles are platinum alloys particles. In a refinement, the platinum-containing particles have formula $P^O M^O_x$, where $P^O$ is a platinum-group metal, $M^O$ is a non-noble metal, and x is the atomic ratio between the $P^O$ is and the $M^O$. In a refinement, x ranges from 2 to 20. In a further refinement, $P^O$ is Ru, Rh, Pd, Ir, or Pt. In a refinement, $M^O$ is nickel (Ni) or cobalt (Co). An example of a particularly useful platinum alloy is platinum-nickel alloy such as $PtNi_3$ particles. Other examples of platinum group metal particles are PtCo particles, $PtCo_3$ particles, $PtCu_3$ particles, $PtZn_3$ particles, $PtFe_3$ particles, $PdNi_3$ particles, $PdFe_3$ particles, $PdRhFe_3$ particles, and the like. An example of a compound having formula 1 is mercaptopropyltrimethoxysilane (MPTS) while an example of a compound having formula 2 is and mercaptopropionic acid (MPA). The compounds having formula 1 and 2 adsorb on the surface of platinum group metal-containing particles 40 to form adsorbed layer 44 due to their strong affinity. FIG. 3A depicts this phenomenon for MPTS and MPA adsorbing on a $PtNi_3$ surface. In step b), the metal M (e.g. silane) in the compound having formula 1 is allowed to hydrolyze to form modified particles 49 having porous shell 34 of metal oxide ($SiO_2$) on surfaces of the platinum group metal-containing particles. In step c), the modified particles are then subjected to acid treatment or electrochemical oxidation to remove a portion of the platinum group metal-containing particles thereby creating caged electrocatalyst particles 32 having a gap 39 between the platinum group metal-containing particles and their metal oxide (e.g., $SiO_2$) shell 34. For example, a fraction of the metal $M^O$ is removed from the $P^O M^O_x$, particles (e.g., Ni is removed from $PtNi_3$ particles). In a refinement, the caged electrocatalyst particles 32 are nanoparticles. These electrocatalyst particles can then be incorporating into fuel cell catalyst layers by methods known to those skilled in the art of fuel cell technology.

In a refinement, one can micro-engineer functional groups on the shell to provide additional functions to the catalysts such as increased proton conductivity and increased tolerant to anion contamination. For example, R—SH remaining on the shell could be converted to a R—$SO_3H$ or R—$SO_2NHSO_2$—R. The R—SH can be converted to R—R—$NH_2$. In these refinement, R can be any of the $R_1$, $R_2$, and $R_3$ set forth above. In another refinement, the powder can be redispersed in isopropanol with a hydrophobic ionic liquid (e.g., about 65 mg) such as (7-methyl-1,5,7-triazabicyclo[4.4.0]dec-5-ene) (bis(perfluoroethylsulfonyl)imide). ("[mtbd][beti]"). Sonicating this solution incorporates the ionic liquid into the void between $PtNi_3$ and $SiO_2$ shell. This type of catalyst was shown to exhibit higher oxygen activity than one without ionic liquid.

The following examples illustrate the various embodiments of the present invention. Those skilled in the art will recognize many variations that are within the spirit of the present invention and scope of the claims.

Preparation of Pt Alloy Nanoparticles Encapsulated with Porous Shell

A transition metal-rich alloy nanoparticle supporting on carbon black such as $PtNi_3$/CB (20 wt % Pt, 20 wt % Ni, 60 wt % carbon black) is used for this preparation. About 5 g of $PtNi_3$/CB, 1M of mercaptopropyltrimethoxysilane (MPTS) and 1M mercaptopropionic acid (MPA) are mixed in a 200 ml of toluene solution. The solution is stir vigorously overnight. During this process the thiols will form a self-assemble adsorption on the $PtNi_3$ surface. The suspension is filtered and washed several times with ethanol. Then the powder was redispersed in ethanol-water (5:1) mixture to allow hydrolyzation of silane to form a silicon dioxide porous shell on the $PtNi_3$ particle. Optionally, 0.5M tetraethoxysilane (TEOS) was added to the mixture to increase the thickness of the $SiO_2$ shell. The suspension is filtered and washed several times with ethanol and water. The powder is stirred in 0.5M $H_2SO_4$ solution for 1 day. During this process about 90% of Ni and all of the MPA were removed from the sample. This creates a void between the now $Pt_3Ni$ particles and the porous $SiO_2$ shell. After being thoroughly washed and dried, the powder is ready for ink and electrode preparation in a conventional fashion.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for forming caged electrocatalyst particles for a fuel cell catalyst layer, the method comprising:
   a) reacting platinum group metal-containing particles, which are supported on carbon particles, with an absorption solution, the absorption solution including a compound having formula 1 and a compound having formula 2:

$$X_1\text{—}R_2\text{-}M\text{-}(OR_1)_n \quad\quad 1$$

$$X_2\text{—}R_3\text{—}Y \quad\quad 2$$

wherein:
   $X_1$ and $X_2$ are each independently SH or $NH_2$;
   $R_1$ are each independently $C_{1-6}$ alkyl;
   M is a metal that can form a metal oxide;
   Y is a moiety that does not react with the compound having formula 1;
   n is an integer represent the number of $OR_1$ groups attached to M;
   $R_2$, $R_3$ are each independently is a $C_{1-6}$ alkylenyl;
   the compounds having formula 1 and formula 2 being adsorbed onto the platinum group metal-containing particles to form an adsorbed layer over the platinum group metal-containing particles;
   b) allowing M in the compound having formula 1 to hydrolyze to form modified particles on the carbon particles, each of the modified particles having a porous metal oxide shell on surfaces of the platinum group metal-containing particles; and then
   c) subjecting the modified particles to acid treatment or electrochemical oxidation to remove a portion of the platinum group metal-containing particles from the modified particles and thereby form a gap between the platinum group-metal containing particles and each corresponding porous metal oxide shell that surrounds the platinum group metal-containing particles, thus creating caged electrocatalyst particles in which each of the corresponding metal oxide shells is attached to each of the corresponding carbon particles and the platinum group metal-containing particles are disposed within a central cavity defined by each of the corresponding metal oxide shells such that each of the corresponding metal oxide shells and the platinum group metal-containing particles are separated by the gap inside each of the corresponding metal oxide shells and do not contact one another.

2. The method of claim 1 wherein M is Si, Al, Ti, or W.

3. The method of claim 1 wherein when M is Si or Ti, n is 3 and when M is Al, n is 2.

4. The method of claim 1 wherein M is Si.

5. The method of claim 1 wherein Y is $CO_2H$, $CH_3$, $NH_2$, or halo.

6. The method of claim 1 wherein $X_1$ and $X_2$ are each SH.

7. The method of claim 1 wherein the platinum group metal-containing particles are each nanoparticles.

8. The method of claim 1 wherein the platinum group metal-containing particles are platinum alloy particles.

9. The method of claim 8 wherein the platinum group metal-containing particles are $PtNi_3$ particles, PtCo particles, $PtCo_3$ particles, $PtCu_3$ particles, $PtFe_3$ particles, $PdNi_3$ particles, $PdFe_3$ particles, or $PdRhFe_3$ particles.

10. The method of claim 9 wherein in step c) a portion of the Ni is removed from $PtNi_3$ particles.

11. The method of claim 1 wherein the compound having formula 1 is mercaptopropyltrimethoxysilane (MPTS).

12. The method of claim 1 wherein the compound having formula 2 is mercaptopropionic acid (MPA).

13. The method of claim 1 wherein step b) comprises dispersing the platinum group metal-containing particles in a mixture comprising water and tetraethoxysilane (TEOS).

14. The method of claim 1 wherein in step c) all of the compound having formula 2 is removed from the surface of the platinum group metal-containing particle.

15. The method of claim 1 wherein step c) comprises stirring the modified particles in a sulfuric acid solution.

16. The method of claim 1 comprising, after step c), converting remaining R—SH on the porous metal oxide shell to R—$SO_3H$, R—$SO_2NHSO_2$—R, or R—R—$NH_2$, wherein R is a $C_{1-6}$ alkyl or a $C_{1-6}$ alkylenyl.

17. The method of claim 1 comprising dispersing the caged electrocatalyst particles in isopropanol with a hydrophobic ionic liquid to incorporate the ionic liquid into the gap between the platinum group metal-containing particles and each corresponding metal oxide shell that surrounds the platinum group metal-containing particles.

* * * * *